US011192481B2

(12) United States Patent
Jeong (10) Patent No.: US 11,192,481 B2
(45) Date of Patent: Dec. 7, 2021

(54) TILTING DEVICE FOR ARMREST

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 16/763,595

(22) PCT Filed: Jun. 26, 2019

(86) PCT No.: PCT/KR2019/007735
§ 371 (c)(1),
(2) Date: May 13, 2020

(87) PCT Pub. No.: WO2020/213788
PCT Pub. Date: Oct. 22, 2020

(65) Prior Publication Data
US 2021/0245638 A1 Aug. 12, 2021

(30) Foreign Application Priority Data
Apr. 19, 2019 (KR) .................. 10-2019-0045826

(51) Int. Cl.
*B60N 2/75* (2018.01)
(52) U.S. Cl.
CPC .................................... *B60N 2/767* (2018.02)
(58) Field of Classification Search
CPC ................................. A47C 7/541; B60N 2/767
See application file for complete search history.

(56) References Cited

U.S. PATENT DOCUMENTS 6,209,960 B1 *   4/2001   Bradbury ............... B60N 2/767
                                                    297/411.35
6,805,513 B2 *  10/2004   Marquina .............. B60N 2/224
                                                    403/107
(Continued)

FOREIGN PATENT DOCUMENTS

JP      2016077835 A     5/2016
KR     10-0554450 B1     3/2006
(Continued)

OTHER PUBLICATIONS

International Searching Authority/KR, International Search Report and Written Opinion of the International Searching Authority, Application No. PCT/KR2019/007735, dated Jan. 16, 2020, 6 pages.

*Primary Examiner* — Philip F Gabler
(74) *Attorney, Agent, or Firm* — Sunstein LLP (57) ABSTRACT

The present invention relates to an armrest tilting device which is slimmed in a width direction of the vehicle by including a housing, a shaft which is rotatable relative to the housing, a bracket installed to interlock with the shaft, a first ratchet installed to be rotatable with respect to the bracket, a second ratchet fixed to the housing and engaged with the first ratchet, a lock spring installed between the bracket and the first ratchet so that, with respect to rotation of the bracket, teeth of the first ratchet are sequentially engaged with teeth of the second ratchet, and a leaf spring installed between an inner side surface of the housing and the bracket so as to apply an elastic force in an axial direction of the shaft.

7 Claims, 8 Drawing Sheets

(56) References Cited

U.S. PATENT DOCUMENTS

| | | | | |
|---|---|---|---|---|
| 7,108,328 B2* | 9/2006 | Himmelhuber | ........ | B60N 2/767 297/411.38 |
| 8,480,177 B2* | 7/2013 | Kobayashi | ............ | B60N 2/767 297/411.38 |
| 8,777,317 B2* | 7/2014 | Saito | .................... | B60N 2/767 297/411.32 |
| 8,944,512 B2* | 2/2015 | Girbinger | .............. | B60N 2/767 297/411.38 |
| 10,308,152 B2* | 6/2019 | Bohlke | ................. | B60N 2/753 |
| 10,363,840 B2* | 7/2019 | Jinka | .................... | F16C 27/063 |
| 10,994,644 B2* | 5/2021 | Suhre | .................... | B60N 2/224 |
| 2007/0241603 A1* | 10/2007 | Otto | ...................... | B60N 2/943 297/411.38 |
| 2008/0030061 A1* | 2/2008 | Pejathaya | .............. | B60N 2/847 297/367 R |
| 2009/0295212 A1* | 12/2009 | Yamane | ................. | B60N 2/767 297/411.32 |
| 2016/0347215 A1* | 12/2016 | Brockman | ............. | B60N 2/767 |

FOREIGN PATENT DOCUMENTS

| | | |
|---|---|---|
| KR | 10-0471361 Y1 | 2/2014 |
| KR | 10-1570427 B1 | 11/2016 |

* cited by examiner

TILTING DEVICE FOR ARMREST

This application is the national phase entry of international patent application no. PCT/KR2019/007735 filed Jun. 26, 2019 and claims the benefit of Korean patent application No. 10-2019-0045826, filed Apr. 19, 2019, the disclosures of which are incorporated herein by reference in their entirety.

TECHNICAL FIELD

The present invention relates to an armrest tilting device which has a reduced number of required components and is slimmed in a width direction while being capable of tilting an armrest at various angles.

BACKGROUND ART

The related art of an armrest tilting device has been disclosed in Korean Patent Registration No. 10-0554450.

The armrest for cars that is disclosed in Korean Patent Registration No. 10-0554450 includes a rest bar, a first gear part connected to the rest bar via a rotation shaft, a second gear part engaged with the first gear part so as to allow the rest bar to rotate at a predetermined angle, and a shake preventer installed at the rotation shaft so as to prevent the rest bar from shaking. The shake preventer prevents the rotation shaft from falling out of the rest bar and the first gear part and also serves to prevent reverse rotation of the rest bar.

However, since the shake preventer of Korean Patent Registration No. 10-0554450 includes first and second shake preventers which are a types of cam, a compression spring configured to press the second shake preventer so as to prevent the reverse rotation of the rest bar and prevent shaking of the rest bar in the rotating direction, and a support plate configured to block one side of the compression spring, there are disadvantages in that the configuration of the shake preventer is complex and a length of the vehicle increases in a width direction.

DISCLOSURE OF INVENTION

Technical Problem

The present invention has been devised to address the above-mentioned problems and is directed to providing an armrest tilting device that uses a leaf spring installed between a bracket and an inner side surface of a housing so as to apply an elastic force in an axial direction of a shaft, thereby slimming the device in a width direction of the vehicle.

Solution to Problem

To achieve the above-mentioned objective, an armrest tilting device according to the present invention includes a housing installed on a seat or an armrest, a shaft which is installed on the other one of the seat and the armrest and is rotatable relative to the housing, a bracket installed to interlock with the shaft, a first ratchet installed to be rotatable with respect to the bracket, a second ratchet fixed to the housing and engaged with the first ratchet, a lock spring installed between the bracket and the first ratchet so that, with respect to rotation of the bracket, teeth of the first ratchet are sequentially engaged with teeth of the second ratchet, and a leaf spring installed between an inner side surface of the housing and the bracket so as to apply an elastic force in an axial direction of the shaft.

An elastic portion having a wave shape may be formed at one side of the leaf spring.

Coupling protrusions formed to protrude from one side surface to the other side surface may be provided at the housing and the second ratchet, and the housing and the second ratchet may be coupled to each other by the coupling protrusions.

The second ratchet may include one or a plurality of ratchets, and the ratchets may be coupled to each other by the coupling protrusions.

A first protrusion configured to stop movement of the first ratchet with respect to the rotation of the bracket may be formed at one side of the second ratchet, and a second protrusion configured to cause the first ratchet to completely deviate from the second ratchet due to the rotation of the bracket may be formed at the other side of the second ratchet.

The elastic portion may be installed to come into contact with the inner side surface of the housing, and a locking step configured to stop rotation of the elastic portion may be formed at the inner side surface of the housing.

The housing may include a first housing and a second housing coupled to the first housing, and a welding portion configured to surround a portion of an outer side surface of the first housing may be formed at the second housing such that the welding portion and the first housing are welded to each other.

Advantageous Effects of Invention

According to an armrest tilting device of the present invention described above, there are the following advantageous effects.

Due to a shaft which is rotatable relative to a housing, a bracket installed to interlock with the shaft, and a leaf spring installed between the bracket and an inner side surface of the housing so as to apply an elastic force in an axial direction of the shaft, the shaft and the bracket can be prevented from moving in the axial direction with respect to the housing. Also, the device can be slimmed in a width direction of the vehicle due to the leaf spring.

Due to an elastic portion formed at one side of the leaf spring so as to come into contact with the inner side surface of the housing, a frictional force between the leaf spring and the housing can be minimized.

Due to the leaf spring interlocking with the shaft and a locking step formed at the inner side surface of the housing so as to stop reverse rotation of the elastic portion, when an armrest connected to the shaft is lifted to a predetermined height or more, the armrest can be fixed in a rotating direction of the shaft. Also, due to the elastic portion and the locking step, the device can be slimmed in the width direction of the vehicle.

Due to a first ratchet installed to be rotatable with respect to the bracket and a second ratchet fixed to the housing and engaged with the first ratchet, an angle of the armrest can be adjusted.

Due to a lock spring configured to apply an elastic force in a direction in which the first ratchet is engaged with the second ratchet, teeth of the first ratchet can be sequentially engaged with teeth of the second ratchet, and the first ratchet can be prevented from rotating in a reverse direction. Also, due to the lock spring, the device can be slimed in the width direction of the vehicle.

Due to coupling protrusions formed to protrude from one side surface to the other side surface at the housing and the second ratchet, the housing and the second ratchet can be coupled to each other without a separate component.

The second ratchet may be provided in plurality of rachets, and the ratchets can be coupled to each other without a separate component.

The number of tilt stages can be freely changed just by changing the number of teeth of the second ratchet.

By forming protrusions at both sides of the second ratchet, movement of the first ratchet with respect to the rotation of the bracket can be stopped, or the first ratchet can be tilted back so that the first ratchet completely deviates from the second ratchet.

In the housing, since a first housing and a second housing, which is disposed at a rear portion of the first housing, are partially welded to each other, a coupling force between the first housing and the second housing can be increased.

MODE FOR THE INVENTION

Hereinafter, exemplary embodiments of the present invention will be described in detail with reference to the accompanying drawings.

For configurations identical to those of the related art among the configurations of the present invention which will be described below, reference should be made to the above-described related art, and detailed description of the identical configurations will be omitted.

Technical terms used herein are merely for mentioning specific embodiments and are not intended to limit the present invention. Singular expressions used herein include plural expressions unless the context clearly indicates otherwise.

The term "include" used herein concretizes specific features, regions, integers, steps, operations, elements, and/or components and do not preclude the existence of or the possibility of adding other specific features, regions, integers, steps, operations, elements, components, and/or groups.

In an exemplary embodiment of the present invention, a front-rear direction is a width direction of the vehicle, a left-right direction is a longitudinal direction of the vehicle, and an up-down direction is a height direction of the vehicle.

An exemplary embodiment of the present invention will be described on the basis of an armrest disposed at the right of a driver.

Figure 1:
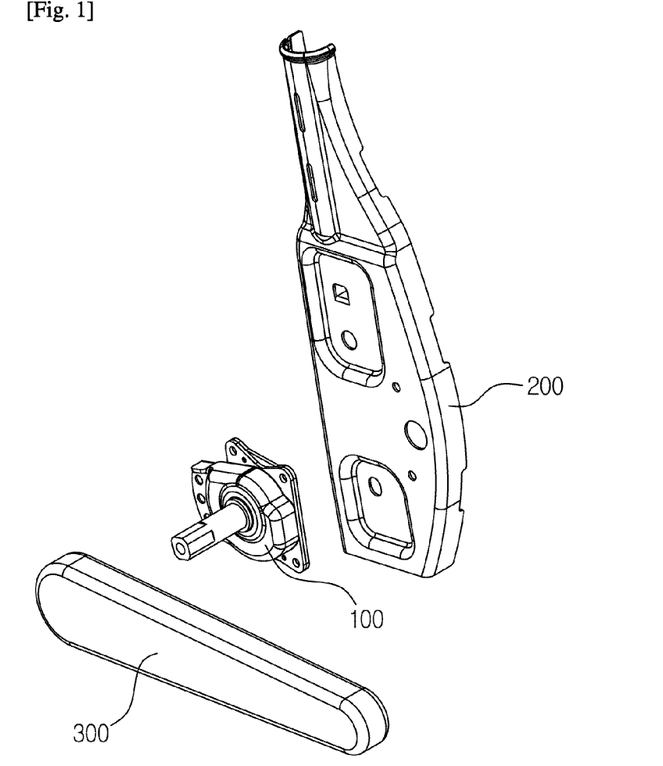
FIG. 1 is a front exploded perspective view of an armrest tilting device according to a first exemplary embodiment of the present invention.

As illustrated in FIG. 1, a rear surface of an armrest tilting device according to a first exemplary embodiment of the present invention is formed of a tilting portion 100, a seat 200 installed at a rear portion of the tilting portion 100, and an armrest 300 installed at a front portion of the tilting portion 100.

Figure 2:
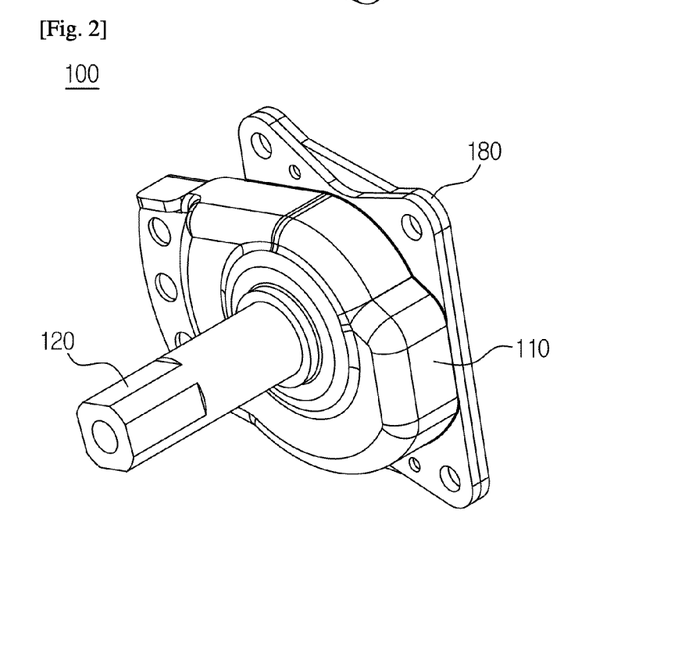
FIG. 2 is a front perspective view of a tilting portion of the armrest tilting device according to the first exemplary embodiment of the present invention.

As illustrated in FIG. 2, the tilting portion 100 includes a housing and a shaft 120 installed to pass through the housing and be rotatable with respect to the housing. The housing includes a first housing 110 and a second housing 180 installed at a rear portion of the first housing 110.

Figure 3:
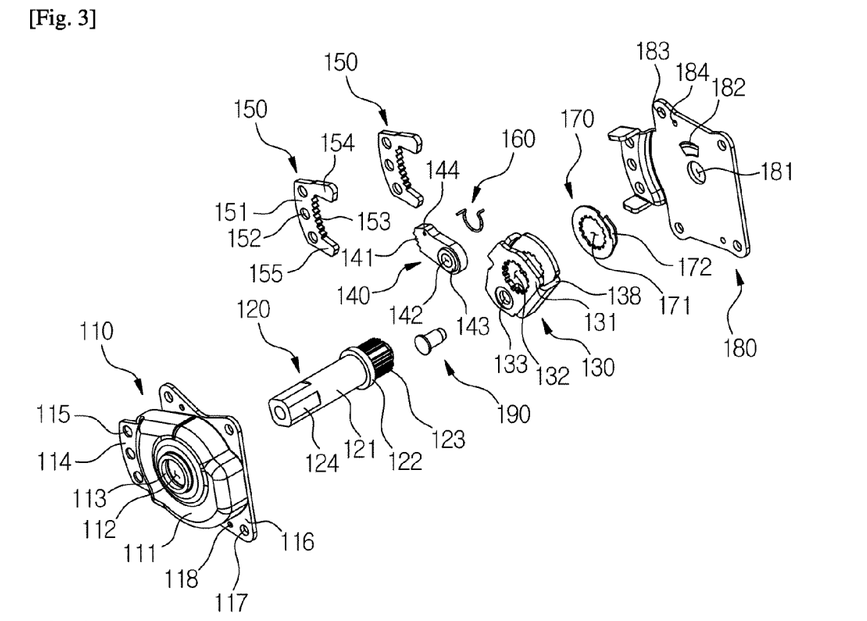
FIG. 3 is a front exploded perspective view of the tilting portion of the armrest tilting device according to the first exemplary embodiment of the present invention line.
Figure 4:
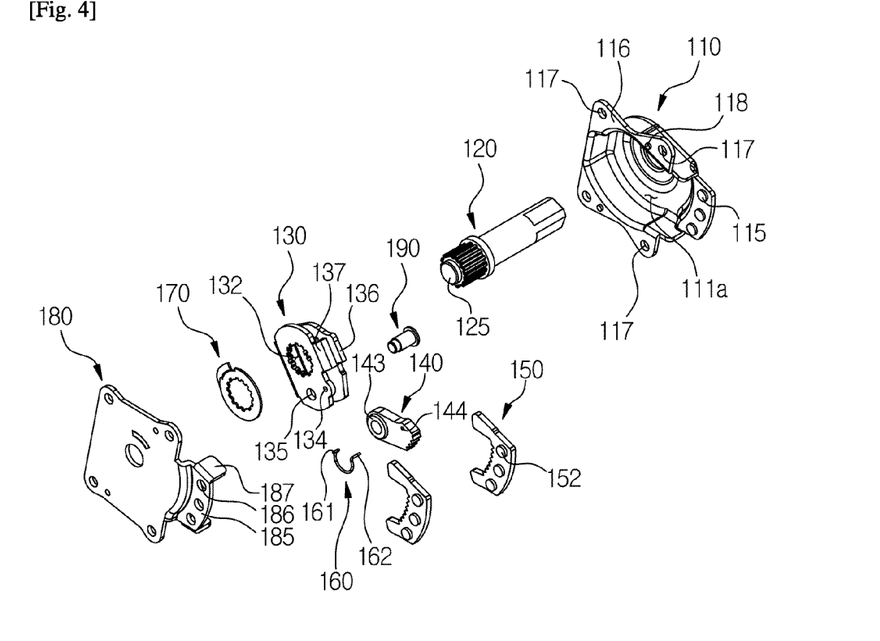
FIG. 4 is a rear exploded perspective view of the tilting portion of the armrest tilting device according to the first exemplary embodiment of the present invention.

The tilting portion 100 is illustrated in more detail in FIGS. 3 and 4.

The tilting portion 100 includes a bracket 130 installed to interlock with the shaft 120, a first ratchet 140 installed to be rotatable with respect to the bracket 130, a second ratchet 150 fixed to the housing and engaged with the first ratchet 140, a lock spring 160 installed between the bracket 130 and the first ratchet 140 so that, with respect to rotation of the bracket 130, teeth of the first ratchet 140 are sequentially engaged with teeth of the second ratchet 150, and a leaf spring 170 configured to apply an elastic force in an axial direction of the shaft 120 so that the bracket 130 does not move with respect to the housing.

The first housing 110 includes a housing central portion 111, a second ratchet installation portion 114 formed at a left side of the housing central portion 111, and housing coupling portions 116 formed at an upper portion and a lower portion of the housing central portion 111.

An inner space 111a in which the bracket 130, the first ratchet 140, and the second ratchet 150, which will be described below, are disposed is formed at a rear portion of the housing central portion 111.

A first shaft insertion groove 112 is formed in the center of the housing central portion 111 so as to pass therethrough in the front-rear direction. The first shaft insertion groove 112 is formed in a circular shape.

A shaft support portion 113 is formed along a periphery of the first shaft insertion groove 112 so as to protrude forward.

Due to the shaft support portion 113, the shaft 120 inserted into the first shaft insertion groove 112 is prevented from shaking in a radial direction.

The second ratchet installation portion 114 is formed in the form of an arc-shaped plate.

A plurality of first coupling portions 115 are formed at the second ratchet installation portion 114 so as to protrude from a front surface to a rear surface.

That is, a groove is formed in a front portion of the first coupling portion 115, and a protrusion is formed at a rear portion of the first coupling portion 115. The groove of the first coupling portion 115 is formed in the form into which the protrusion of the first coupling portion 115 may be fitted.

More specifically, the housing coupling portions 116 are formed to protrude in a triangular shape at an upper left side, an upper right side, a lower left side, and a lower right side of the housing central portion 111. The housing coupling portion 116 are formed in the form of a plate.

A first coupling groove 117 is formed in the triangular shape of each housing coupling portion 116 so as to pass therethrough in the front-rear direction.

Housing coupling protrusions 118 are formed at inner portions of the first coupling grooves 117 in the housing coupling portions 116 disposed at the upper left side and the lower right side of the housing central portion 111. The housing coupling protrusion 118 is formed to protrude from a front surface to a rear surface.

The shaft 120 is formed in a cylindrical shape as a whole.

The shaft 120 includes an armrest connecting portion 121 exposed to the front of the first housing 110, a locking portion 122 formed at a rear portion of the armrest connecting portion 121, a gear portion 123 formed at a rear portion of the locking portion 122, and a housing fitting portion 125 formed at a rear portion of the gear portion 123 and coupled to the second housing 180.

A diameter of the armrest connecting portion 121 is formed to be less than or similar to a diameter of the first shaft insertion groove 112 of the first housing 110.

Armrest installation grooves 124 are formed at the top, bottom, left, and right in the axial direction at a front portion of a peripheral portion of the armrest connecting portion 121.

Due to the armrest installation grooves 124, four corners are formed at the front portion of the armrest connecting portion 121, and, due to the corners, idle rotation of a portion at which the armrest connecting portion 121 and the armrest 300 are connected is prevented.

The locking portion 122 is formed in the shape of a disc.

A diameter of the locking portion 122 is formed to be larger than a diameter of the armrest connecting portion 121. Due to the locking portion 122, when the shaft 120 is fitted to the first housing 110 from the rear to the front, the shaft 120 is prevented from deviating forward from the first housing 110.

The gear portion 123 is formed in the shape of a pinion. Teeth of the gear portion 123 are formed excluding a pair of teeth facing each other.

Due to the portions at which the teeth are not formed, during assembly of the tilting portion 100, it is always possible to assemble the bracket 130 and the leaf spring 170, which will be described below, at the same positions with respect to the shaft 120.

A diameter of the housing fitting portion 125 is formed to be less than an inner diameter of the teeth of the gear portion 123. The housing fitting portion 125 is fitted into a second shaft insertion groove 181 of the second housing 180 which will be described below.

Thus, when the shaft 120 is fitted to the second housing 180 from the front to the rear, the shaft 120 is prevented from deviating rearward from the second housing 180.

The bracket 130 includes two support plates 131 disposed side-by-side behind and in front of each other and a connecting plate 138 configured to connect right sides of the two support plates 131 to each other.

A gear portion installation groove 132 is formed in an upper portion of each support plate 131 so as to pass therethrough in the front-rear direction. The shape of the gear portion installation groove 132 is formed to be similar or identical to the shape of the gear portion 123.

The gear portion 123 of the shaft 120 is inserted into the gear portion installation grooves 132 of the two support plates 131.

Thus, a front surface of the support plate 131 disposed at the front comes into contact with a rear surface of the locking portion 122 of the shaft 120, and the housing fitting portion 125 of the shaft 120 protrudes to an outer side of a rear surface of the support plate 131 disposed at the rear.

Also, the bracket 130 and the shaft 120 are firmly coupled to each other such that, according to rotation of the shaft 120, the bracket 130 may rotate by interlocking with the shaft 120 without idly rotating.

A first rivet insertion groove 133 is formed at a lower portion of the support plate 131 disposed at the front. A main body of a rivet 190 is inserted into the first rivet insertion groove 133.

The rivet 190 is formed of the main body, a head formed with a diameter larger than that of the main body, and an end formed with a diameter less than that of the main body.

A locking groove into which the head of the rivet 190 may be inserted is formed in a front portion of the first rivet insertion groove 133.

A second rivet insertion groove 135 is formed at a lower portion of the support plate 131 disposed at the rear. The second rivet insertion groove 135 is disposed to be collinear with the first rivet insertion groove 133. The end of the rivet 190 is inserted into the second rivet insertion groove 135.

A first lock spring installation groove 134 is formed in a lower portion of the left side of the support plate 131 disposed at the rear so as to pass therethrough in the front-rear direction.

A first protrusion 136 is formed at an upper portion of the left side of support plate 131 disposed at the front. The first protrusion 136 is formed to protrude leftward.

A second protrusion 137 is formed at an upper portion of the left side of the support plate 131 disposed at the rear. The second protrusion 137 is formed to extend leftward and then be bent forward. The second protrusion 137 is formed so that a front surface of the second protrusion 137 and a rear surface of the first protrusion 136 are spaced apart from each other by a predetermined interval.

Thus, the support plates 131 may be elastically deformed in the front-rear direction.

First ratchet teeth 141 are formed at the left side of the first ratchet 140.

A third rivet insertion groove 142 is formed in the right side of the first ratchet 140 so as to pass therethrough in the front-rear direction.

A diameter of the third rivet insertion groove 142 is formed to be similar or identical to the diameter of the first rivet insertion groove 133 so that the main body of the rivet 190 is inserted into the third rivet insertion groove 142.

Due to the rivet 190 that is inserted through the first, second, and third rivet insertion grooves 133, 135, and 142, the first ratchet 140 is coupled to the bracket 130.

Spaced-apart protrusions 143 are formed at a periphery of the third rivet insertion groove 142 so as to protrude forward and rearward therefrom.

A distance from a front surface of the spaced-apart protrusion 143 formed at the front portion of the first ratchet 140 to a rear surface of the spaced-apart protrusion 143 formed at the rear portion of the first ratchet 140 is less than or similar to a distance between the two support plates 131.

The spaced-apart protrusions 143 are formed to come into contact with inner side surfaces of the two support plates 131 of the bracket 130.

Thus, an area in which the first ratchet 140 and the support plates 131 come into contact with each other decreases such that a frictional force therebetween decreases, and a space is formed between the rear surface of the first ratchet 140 and the support plates 131 such that the lock spring 160, which will be described below, may be installed in the space.

A second lock spring installation groove 144 is formed in the left side of the first ratchet 140 so as to pass therethrough in the front-rear direction.

A distance from the center of the third rivet insertion groove 142 to the center of the second lock spring installation groove 144 is formed to be larger than a distance from the center of the second rivet insertion groove 135 of the bracket 130 to the center of the first lock spring installation groove 134.

The second ratchet 150 is formed in the shape of a C-shaped plate.

The second ratchet 150 includes a fixing portion 151 installed at the first housing 110 or the second housing 180, a first locking portion 154 formed at an upper portion of the fixing portion 151 so as to protrude rightward, and a second locking portion 155 formed at a lower portion of the fixing portion 151 so as to protrude rightward.

The fixing portion 151 is formed in the form similar to that of the second ratchet installation portion 114 of the first housing 110.

A plurality of second coupling portions 152 are formed at the fixing portion 151 so as to protrude from a front surface to a rear surface. The second coupling portions 152 are disposed to be collinear with the first coupling portions 115 of the first housing 110 and are formed to be identical or similar to the first coupling portions 115.

Thus, protrusions of the first coupling portions 115 and grooves of the second coupling portions 152 may be coupled to each other.

Also, the second coupling portions 152 may be used in coupling different second ratchets 150.

In the first exemplary embodiment of the present invention, two second ratchets 150 are coupled to each other.

The front-rear length of the second ratchets 150 coupled to each other is formed to be smaller than the interval between the two support plates 131 of the bracket 130.

Second ratchet teeth 153 are formed at the right side of the fixing portion 151. The second ratchet teeth 153 may be formed to be engaged with the first ratchet teeth 141 of the first ratchet 140.

One side surface of the second ratchet teeth 153 is formed with a slope similar to a moving direction of the first ratchet 140 when the bracket 130 rotates counterclockwise, and the other side surface of the second ratchet teeth 153 is formed with a slope that is almost perpendicular to a moving direction of the first ratchet 140 when the bracket 130 rotates clockwise.

Due to the shape of the second ratchet teeth 153, when the bracket 130 rotates counterclockwise, the first ratchet teeth 141 slide along surfaces of the second ratchet teeth 153, and, when the bracket 130 rotates clockwise, an advancing direction of the first ratchet teeth 141 is blocked by the second ratchet teeth 153, and thus rotation of the bracket 130 is stopped.

That is, reverse rotation of the armrest 300 is prevented.

By adjusting the number of second ratchet teeth 153, the number of tilt stages of the armrest 300 may be adjusted.

The lock spring 160 is formed in an arc shape in which an opening is formed at an upper portion.

A first bent portion 161 which is bent rearward is formed at one end of the lock spring 160, and a second bent portion 162 which is bent forward is formed at the other end of the lock spring 160.

The first bent portion 161 is inserted into the first lock spring installation groove 134 of the bracket 130, and the second bent portion 162 is inserted into the second lock spring installation groove 144 of the first ratchet 140.

Due to such a lock spring 160, the first ratchet 140 is installed at the bracket 130 in a state in which the first ratchet 140 is rotated toward the first lock spring installation groove 134 about the third rivet insertion groove 142.

A distance between the first bent portion 161 and the second bent portion 162 of the lock spring 160 is formed to be large than an interval between the first lock spring installation groove 134 and the second lock spring installation groove 144 when the first ratchet 140 is installed between the bracket 130 and the second ratchet 150.

Thus, an elastic force that pushes the first ratchet 140 acts on the lock spring 160.

About an axis that crosses the center of the second rivet insertion groove 135 of the bracket 130 and crosses the center of the first lock spring installation groove 134, a section in which the second lock spring installation groove 144 of the first ratchet 140 is relatively farther from the gear portion installation groove 132 of the bracket 130 will be referred to as "first section," and a section in which the second lock spring installation groove 144 of the first ratchet 140 is relatively nearer to the gear portion installation groove 132 of the bracket 130 will be referred to as "second section."

In the first section, an elastic force acts on the lock spring 160 in a direction in which the first ratchet 140 is engaged with the second ratchet 150, and, in the second section, an elastic force acts on the lock spring 160 in a direction in which the first ratchet 150 is separated from the second ratchet 150.

A transition section in which a direction of the elastic force acting on the lock spring 160 maintains an existing direction is present between the first section and the second section.

The leaf spring 170 is formed in the shape of a circular plate.

A gear portion fitting groove 171 is formed in the central portion of the leaf spring 170 so as to pass therethrough in the front-rear direction. The shape of the gear portion fitting groove 171 is formed to be similar or identical to the shape of the gear portion 123 of the shaft 120.

Thus, the leaf spring 170 and the shaft 120 are more firmly coupled to each other such that, according to rotation of the shaft 120, the leaf spring 170 may rotate by interlocking with the shaft 120 without idly rotating.

An elastic portion 172 is formed at one side of the leaf spring 170.

The elastic portion 172 is formed to extend in a tangential direction of the leaf spring 170 from one side of the leaf spring 170 and then extend a predetermined distance along a periphery of the leaf spring 170.

The elastic portion 172 is formed such that an inner peripheral surface of the elastic portion 172 and an outer peripheral surface of the leaf spring 170 are spaced apart at a predetermined interval from each other.

That is, a free end of the elastic portion 172 may be elastically deformed in the front-rear direction.

The elastic portion 172 is formed in a curved wave shape from the front to the rear.

That is, a portion of the elastic portion 172 protrudes more rearward than a rear surface of the leaf spring 170, and a curved portion of the elastic portion 172 may be elastically deformed in the front-rear direction.

The leaf spring 170 is installed between the bracket 130 and the second housing 180.

In this case, only a rear surface of the elastic portion 172 comes into contact with the second housing 180. That is, due to the elastic portion 172, a frictional force between the leaf spring 170 and the second housing 180 is minimized.

Due to the elastic force of the leaf spring 170, the bracket 130 receives a forward force, and, as a result, the locking portion 122 of the shaft 120 is adhered to a rear surface of the first housing 110.

The second housing 180 is formed in the form of a plate that is similar or identical to the shape of the first housing 110 as a whole.

A second shaft insertion groove 181 is formed in the center of the second housing 180 so as to pass therethrough in the front-rear direction. The second shaft insertion groove 181 is formed so that the housing fitting portion 125 of the shaft 120 may be fitted thereinto.

A locking step 182 is formed at an upper portion of the second housing 180 so as to protrude forward.

The locking step 182 is formed in an arc shape with the second shaft insertion groove 181 as the center.

Figure 13:
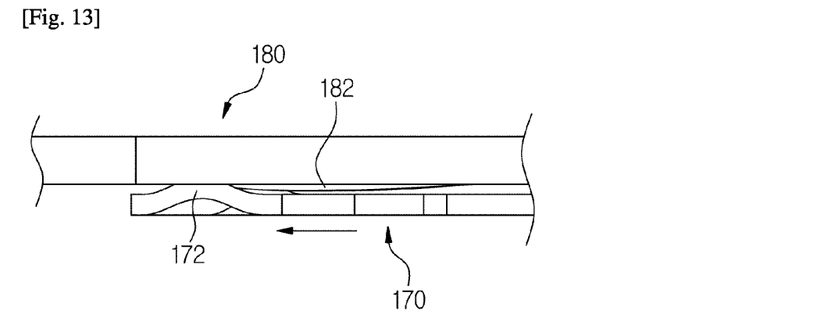
FIG. 13 is a plan view of the leaf spring and the second spring in the third state of the armrest tilting device according to the first exemplary embodiment of the present invention.

As illustrated in FIG. 13, a left side portion of the locking step 182 has a steep slope while a right side portion thereof has a gentle slope. The left side portion and the right side portion of the locking step 182 are connected with a curve.

Thus, when the leaf spring 170 installed at the front portion of the second housing 180 rotates counterclockwise, the elastic portion 172 of the leaf spring 170 smoothly moves by moving along the gentle slope of the locking step 182.

On the other hand, when the elastic portion 172 is disposed at the left side of the locking step 182, due to the steep slope of the locking step 182, it becomes difficult for the leaf spring 170 to rotate clockwise. That is, the elastic portion 172 may cross the locking step 182 and the leaf spring 170 may rotate clockwise only when the user exerts a force of a certain strength or more.

Second coupling grooves 183 are formed at the upper left side, upper right side, lower left side, and lower right side of the second housing 180 so as to pass therethrough in the front-rear direction.

The second coupling grooves 183 are disposed to be collinear with the first coupling grooves 117 of the first housing 110.

Due to rivets (not illustrated) inserted into the first coupling grooves 117 and the second coupling grooves 183, the first housing 110 and the second housing 180 may be installed on the seat 200.

Fitting grooves 184 are formed at inner sides of the second coupling grooves 183 disposed at the upper left side and the lower right side of the second housing 180. The fitting grooves 184 are formed so that front surfaces thereof are open.

The housing coupling protrusions 118 of the first housing 110 may be inserted into the fitting grooves 184, and thus the first housing 110 and the second housing 180 may be coupled to each other.

A second ratchet cover 185 is formed at the left side of the second housing 180.

The second ratchet cover 185 is formed in the form of an arc-shaped plate.

Second ratchet fixing plates 187 are formed at an upper portion and a lower portion of the second ratchet cover 185 so as to protrude forward.

The second ratchet fixing plates 187 come into contact with an upper surface and a lower surface of the second ratchet installation portion 114 of the first housing 110.

The second ratchet fixing plates 187 come into contact with an upper surface and a lower surface of the second ratchet 150.

A plurality of third coupling portions 186 are formed at the second ratchet cover 185 so as to pass therethrough in the front-rear direction. The third coupling portions 186 are disposed to be collinear with the second coupling portions 152 and are formed in the forms into which protrusions of the second coupling portions 152 may be fitted.

Thus, the protrusions of the second coupling portions 152 and the third coupling portions 186 may be coupled to each other.

Inner side surfaces of the second ratchet fixing plates 187 and an outer side surface of the second ratchet installation portion 114 may be welded to each other so that the first housing 110 and the second housing 180 are firmly coupled to each other.

Also, the second ratchet 150 may be firmly coupled to the first housing 110 and the second housing 180. The phenomenon in which coupling between the housing and the second ratchet 150 or coupling between the second ratchets 150 is loosened due to vibration applied to the second ratchet 150 due to rotation of the armrest 300 is prevented.

Hereinafter, an operating process of the armrest tilting device will be described with reference to FIGS. 5 to 15.

Figure 5:
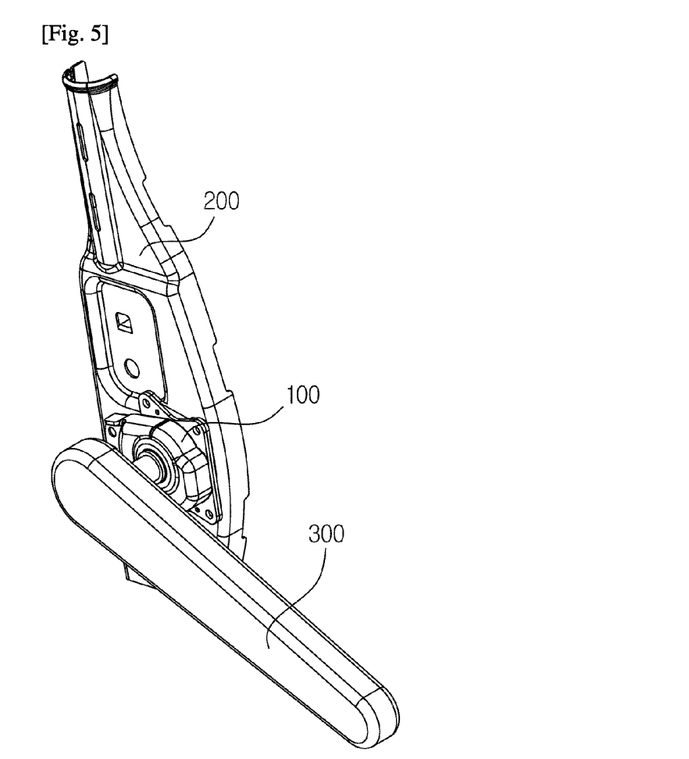
FIG. 5 is a front perspective view of a first state of the armrest tilting device according to the first exemplary embodiment of the present invention in which an armrest is at the lowermost end.

A state in which a free end of the armrest 300 is disposed at the lowermost end as illustrated in FIG. 5 is referred to as "first state."

Figure 6:
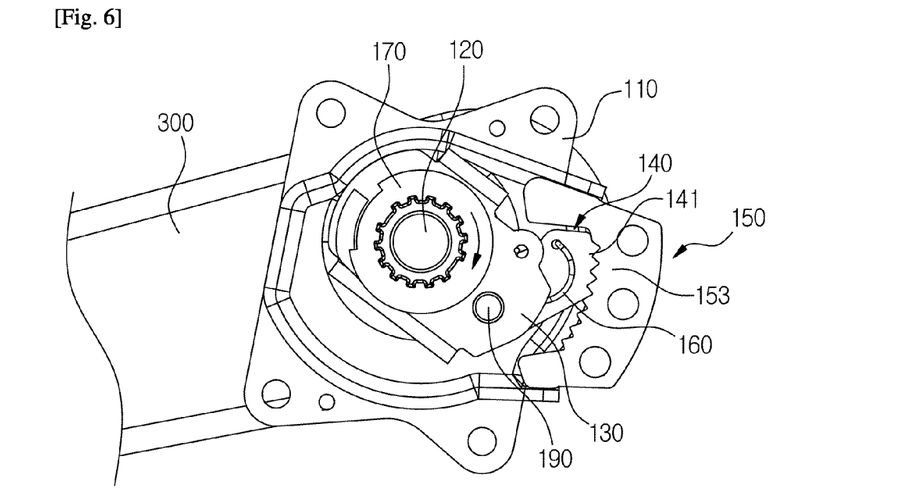
FIG. 6 is a rear view of the first state of the armrest tilting device according to the first exemplary embodiment of the present invention (excluding a second housing).
Figure 7:
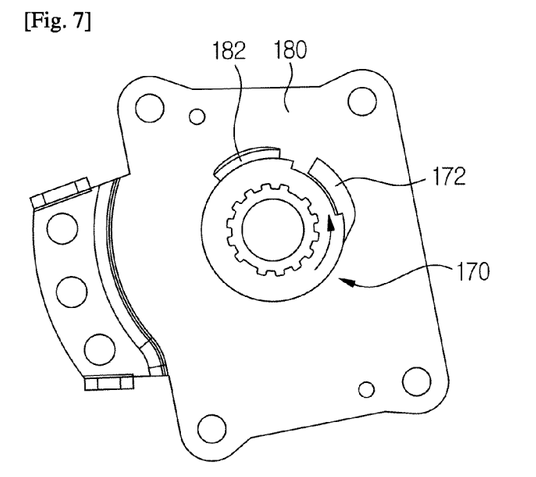
FIG. 7 is a front view of a leaf spring and the second housing in the first state of the armrest tilting device according to the first exemplary embodiment of the present invention.

The first state is illustrated in detail in FIGS. 5 to 7.

In the first state, as illustrated in FIG. 6, the first ratchet teeth 141 of the first ratchet 140 are engaged with the uppermost portion of the second ratchet teeth 153 of the second ratchet 150.

Also, as illustrated in FIG. 7, the elastic portion 172 of the leaf spring 170 is spaced apart from the locking step 182 of the second housing 180 and disposed at the right side of the locking step 182.

In this case, when the armrest 300 is lifted at a predetermined angle, the shaft 120 rotates according to the armrest 300, and, according to the rotation of the shaft 120, the bracket 130 and the leaf spring 170 installed at the shaft 120 rotate.

A state in which multi-stage adjustment is performed while the armrest 300 is lifted at a predetermined angle as described above is referred to as "second state."

Figure 8:
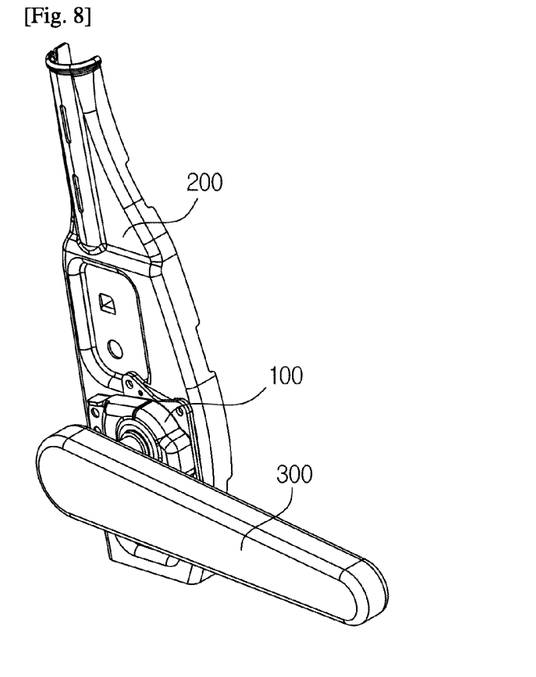
FIG. 8 is a front perspective view of a second state of the armrest tilting device according to the first exemplary embodiment of the present invention in which the armrest is being adjusted in multi-stages.
Figure 9:
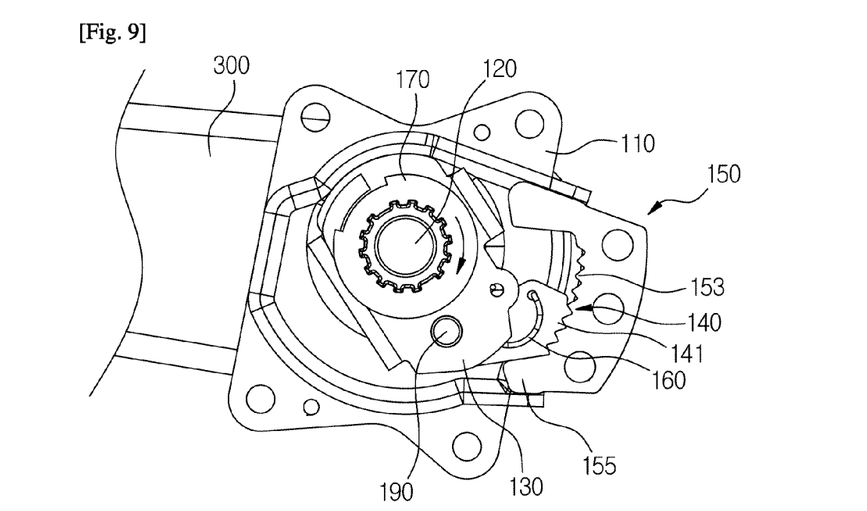
FIG. 9 is a rear view of the second state of the armrest tilting device according to the first exemplary embodiment of the present invention (excluding the second housing).

The second state is illustrated in detail in FIGS. 8 and 9.

In the second state, when the shaft 120 rotates counterclockwise, due to the bracket 130 rotating according to the shaft 120, the first ratchet 140 also moves according to the bracket 130.

In this case, since the lock spring 160 pushes the first ratchet 140 toward the second ratchet 150 due to the elastic force, the first ratchet teeth 141 of the first ratchet 140 are sequentially engaged with the second ratchet teeth 153 of the second ratchet 150.

In the first exemplary embodiment of the present invention, the armrest 300 may be adjusted in multi-stages at a predetermined angle. The armrest 300 may be adjusted in multi-stages through four stages, excluding the position of the armrest 300 in the first state.

The predetermined angle may be 2° at minimum and 10° at maximum.

Since reverse rotation of the armrest 300 is stopped due to the shape of the second ratchet teeth 153, when a force that adjusts the armrest 300 in the second state is eliminated, the armrest 300 maintains its position resulting from the multi-stage adjustment.

FIG. 9 is a state view illustrating a state in which the armrest 300 has reached the last stage of the multi-stage adjustment.

In this case, the first ratchet teeth 141 of the first ratchet 140 are engaged with the lowermost portion of the second ratchet teeth 153 of the second ratchet 150.

Figure 10:
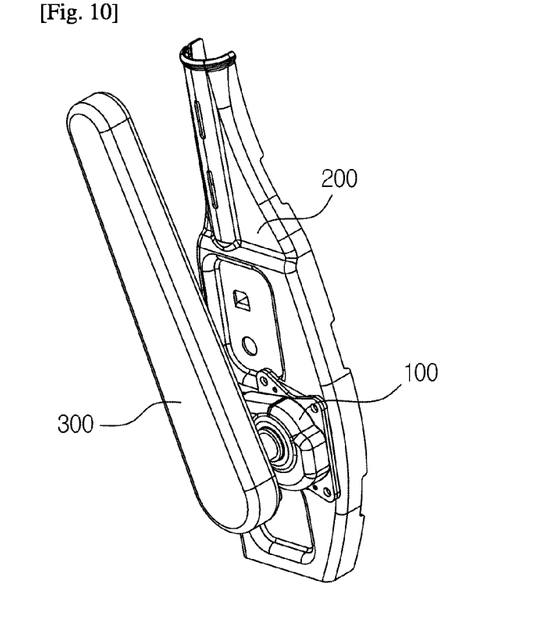
FIG. 10 is a front perspective view of a third state of the armrest tilting device according to the first exemplary embodiment of the present invention in which the armrest is completely lifted.

In this state, when the armrest 300 is completely lifted, the armrest 300 is tilted back more rearward than a front surface of the seat 200 as illustrated in FIG. 10. Such a state is referred to as "third state."

The third state is illustrated in detail in FIGS. 10 to 13.

As illustrated in FIG. 9, when the armrest 300 is lifted in a state in which the first ratchet teeth 141 are engaged with the lowermost portion of the second ratchet teeth 153, the first ratchet 140 is blocked by the second locking portion 155 of the second ratchet 150 and is unable to rotate according to the bracket 130.

Thus, the first ratchet 140 rotates about the rivet 190 installed at the bracket 130, in a direction opposite to the rotating direction of the bracket 130.

When the first ratchet 140 rotates a predetermined angle or more, a direction of the elastic force of the lock spring 160 is changed, and the first ratchet 140 is pushed in a direction in which the second lock spring installation groove 144 of the first ratchet 140 becomes nearer to the gear portion installation groove 132 of the bracket 130 due to the lock spring 160. That is, the first ratchet 140 is folded such that the first ratchet 140 forms an L-shape with the bracket 130.

Thus, since the first ratchet 140 is spaced apart from the second locking portion 155, the first ratchet 140 rotates according to the bracket 130 and deviates from the second locking portion 155.

Figure 11:
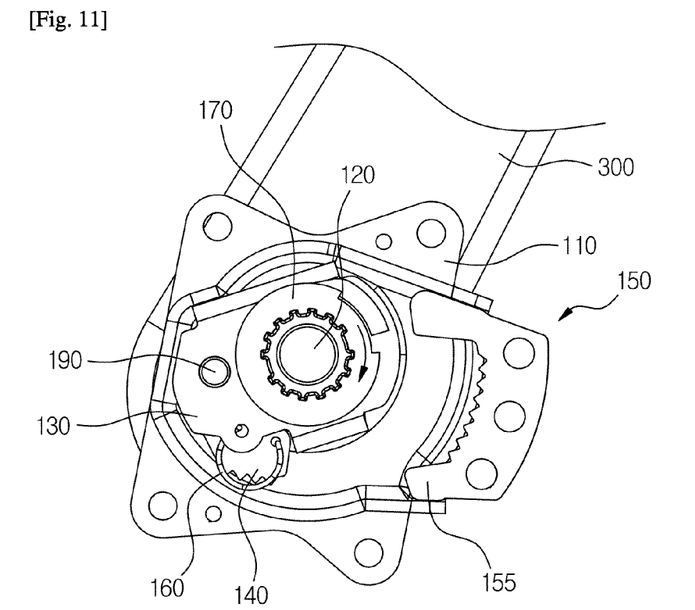
FIG. 11 is a rear view of the third state of the armrest tilting device according to the first exemplary embodiment of the present invention (excluding the second housing).

When the first ratchet 140 deviates from the second ratchet 150, as illustrated in FIG. 11, the armrest 300 rotates until the bracket 130 comes into contact with the inner side surface of the first housing 110.

Due to the elastic force of the lock spring 160, the first ratchet 140 maintains the state when the first ratchet 140 deviates from the second locking portion 155.

Figure 12:
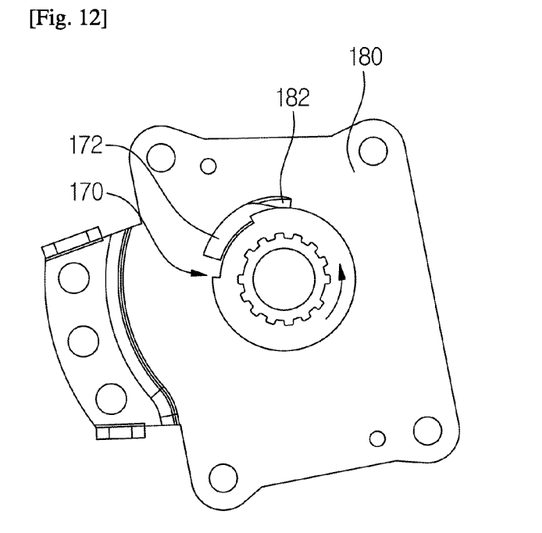
FIG. 12 is a front view of the leaf spring and the second housing in the third state of the armrest tilting device according to the first exemplary embodiment of the present invention.

In this case, as illustrated in FIGS. 12 and 13, the elastic portion 172 of the leaf spring 170 crosses the locking step 182 of the second housing 180 and is disposed at the left side of the locking step 182.

Thus, the armrest 300 maintains its position in the third state without moving downward unless a force of a certain strength or more is applied to the armrest 300.

A state in which the armrest 300 moves downward due to the force of the certain strength or more applied thereto is referred to as "fourth state."

Figure 14:
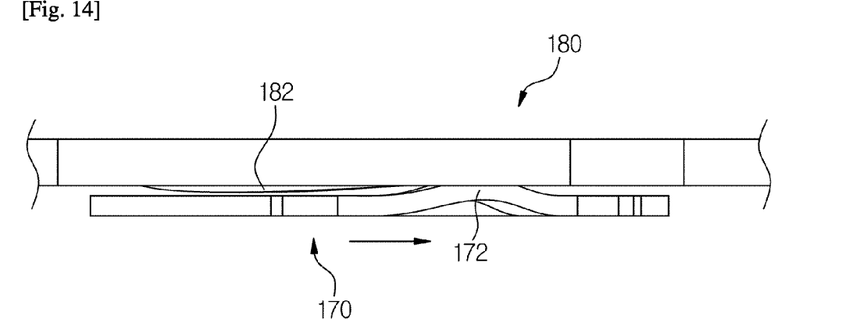
FIG. 14 is a plan view of the leaf spring and the second housing in a fourth state of the armrest tilting device according to the first exemplary embodiment of the present invention in which the leaf spring is deviated from a locking step of the second housing.

The fourth state is illustrated in detail in FIG. 14.

When the armrest 300 in the third state is lowered, the leaf spring 170 rotates clockwise according to the shaft 120, and, as illustrated in FIG. 14, the elastic portion 172 of the leaf spring 170 deviates from the locking step 182 of the second housing 180 and is disposed at the right side of the locking step 182.

A state in which, in order to return the armrest 300 to the first state, the armrest 300 is lowered until the first ratchet 140 comes into contact with the first locking portion 154 of the second ratchet 150 is referred to as "fifth state."

Figure 15:
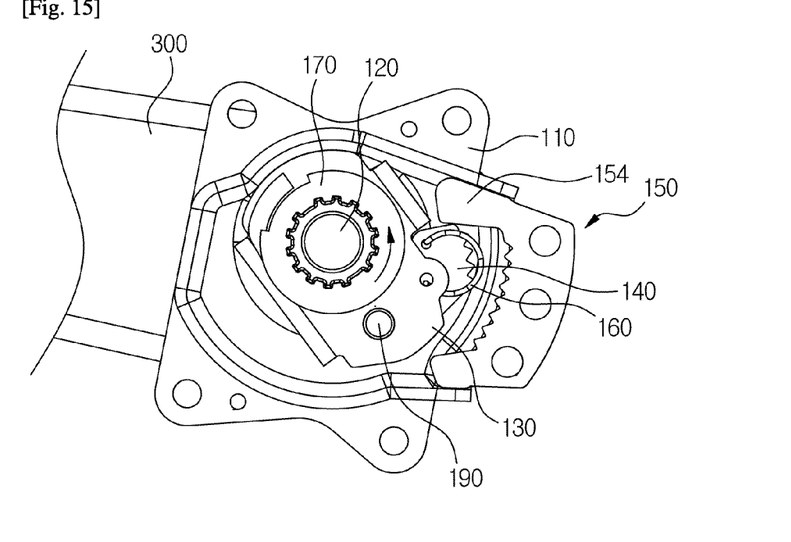
FIG. 15 is a rear view of a fifth state of the armrest tilting device according to the first exemplary embodiment of the present invention (excluding the second housing) in which, in order to return the armrest to the first state, the armrest is rotated until a first ratchet comes into contact with one side of a second ratchet.

The fifth state is illustrated in detail in FIG. 15.

As illustrated in FIG. 15, since the first ratchet 140 maintains the state when the first ratchet 140 deviates from the second locking portion 155, the first ratchet teeth 141 and the second ratchet teeth 153 are spaced apart at a predetermined interval.

Thus, instead of being engaged with the second ratchet 150, the first ratchet 140 rotates clockwise until the first ratchet 140 comes into contact with the first locking portion 154 of the second ratchet 150.

When the armrest 300 is lowered in the fifth state, since the first ratchet 140 is blocked by the first locking portion 154 of the second ratchet 150, the first ratchet 140 rotates counterclockwise about the lock spring 160 installed at the bracket 130 and then is engaged with the second ratchet 150. That is, the armrest 30 returns to the first state.

Hereinafter, an armrest tilting device according to a second exemplary embodiment of the present invention will be described.

Detailed description of configurations identical to those of the first embodiment described above will be omitted.

Figure 16:
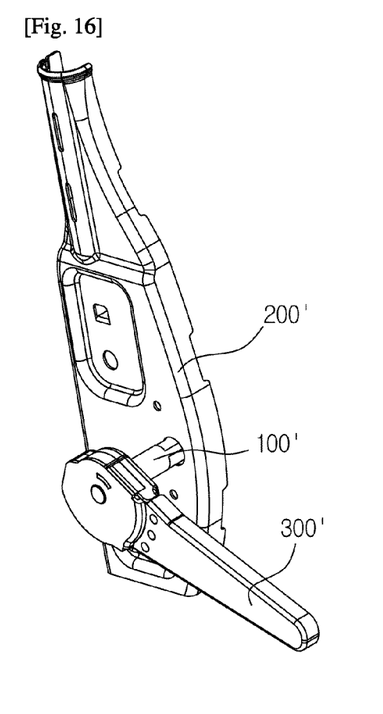
FIG. 16 is a front perspective view of an armrest tilting device according to a second exemplary embodiment of the present invention.

As illustrated in FIG. 16, in the armrest tilting device according to the second exemplary embodiment of the present invention, a housing of a tilting portion 100' is installed at an armrest 300', and a shaft of the tilting portion 100' is installed at a seat 200'.

The present invention has been described above with reference to the exemplary embodiments thereof, but those of ordinary skill in the art may modify or change the present invention in various ways within the scope not departing from the idea and range of the present invention described in the claims below.

DESCRIPTION OF REFERENCE NUMERALS

100: tilting portion
200: seat
300: armrest
110: first housing, 111: housing central portion
111a: inner space, 112: first shaft insertion groove
113: shaft support portion, 114: second ratchet installation portion
115: first coupling portion, 116: housing coupling portion 117: first coupling groove, 118: housing coupling protrusion
120: shaft, 121: armrest connecting portion
122: locking portion, 123: gear portion
124: armrest installation groove, 125: housing fitting portion
130: bracket, 131: support plate
132: gear portion installation groove
133: first rivet installation groove
134: first lock spring installation groove
135: second rivet installation groove
136: first protrusion, 137: second protrusion
138: connecting plate
140: first ratchet, 141: first ratchet teeth
142: third rivet installation groove, 143: spaced-apart protrusion
144: second lock spring installation groove
150: second ratchet, 151: fixing portion
152: second coupling portion, 153: second ratchet teeth
154: first locking portion, 155: second locking portion
160: lock spring, 161: first bent portion
162: second bent portion
170: leaf spring, 171: gear portion fitting groove
172: elastic portion
180: second housing, 181: second shaft insertion groove
182: locking step, 183: second coupling groove
184: fitting groove, 185: second ratchet cover
186: third coupling portion, 187: second ratchet fixing plate
190: rivet

What is claimed is:

1. An armrest tilting device comprising:
a housing being installed on one of a seat and an armrest;
a shaft, being installed on another of the seat and the armrest, and being rotatable relative to the housing;
a bracket being coupled to the shaft;
a first ratchet being rotatably coupled to the bracket;
a rivet, inserted into the bracket and the first ratchet;
a second ratchet, being fixed to the housing, and being engaged with the first ratchet;
a lock spring, having one end connected to the bracket, having another end connected to the first ratchet, and providing the first ratchet with an elastic force toward the second ratchet; and
a plate spring, being installed between an inner surface of the housing and the bracket, and providing the bracket with an elastic force in an axial direction of the shaft.

2. The armrest tilting device of claim 1, wherein an elastic portion having a wave shape is formed at one side of the plate spring.

3. The armrest tilting device of claim 2, wherein:
the elastic portion is in contact with the inner surface of the housing; and
a locking step configured to stop rotation of the elastic portion is formed at the inner surface of the housing.

4. The armrest tilting device of claim 1, wherein:
coupling protrusions formed to protrude from one side to another side are provided at the housing and the second ratchet; and
the housing and the second ratchet are coupled to each other by the coupling protrusions.

5. The armrest tilting device of claim 4, wherein:
the second ratchet is formed of a plurality of ratchets; and
the plurality of ratchets are coupled to each other by the coupling protrusions.

6. The armrest tilting device of claim 1, wherein:
a first locking portion configured to stop movement of the first ratchet is formed at one side of the second ratchet; and
a second locking portion configured to cause the first ratchet to completely deviate from the second ratchet due to the rotation of the bracket is formed at another side of the second ratchet.

7. The armrest tilting device of claim 1, wherein:
the housing includes a first housing and a second housing coupled to the first housing; and
a welding portion surrounding a portion of an outer surface of the first housing is formed at the second housing such that the welding portion and the first housing are weldable to each other.

* * * * *